(12) United States Patent
Miller et al.

(10) Patent No.: US 12,197,648 B2
(45) Date of Patent: Jan. 14, 2025

(54) DISPLAY SYSTEM INTERFACE USING VISUALLY-EVOKED CORTICAL POTENTIALS

(71) Applicant: UNITED STATES OF AMERICAS AS REPRESENTED BY THE ADMINISTRATOR OF NASA, Washington, DC (US)

(72) Inventors: Michael E. Miller, Xenia, OH (US); Brett J. Borghetti, Beavercreek, OH (US); Kellie D. Kennedy, Poquoson, VA (US); Chad L. Stephens, Poquoson, VA (US); Alan T. Pope, Poquoson, VA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 84 days.

(21) Appl. No.: 18/104,913

(22) Filed: Feb. 2, 2023

(65) Prior Publication Data
US 2024/0264669 A1   Aug. 8, 2024

(51) Int. Cl.
*G06F 3/01*     (2006.01)
*G09G 5/00*     (2006.01)

(52) U.S. Cl.
CPC .............. *G06F 3/015* (2013.01); *G06F 3/013* (2013.01); *G09G 5/005* (2013.01); *G09G 2340/0435* (2013.01)

(58) Field of Classification Search
CPC ......... G06F 3/015; G06F 3/013; G09G 5/005; G09G 2340/0435
See application file for complete search history.

(56) References Cited

U.S. PATENT DOCUMENTS 5,649,061 A   7/1997   Smyth
6,023,259 A   2/2000   Howard et al.
              (Continued)

OTHER PUBLICATIONS

Volosyak et al., "Impact of Frequency Selection on LCD Screens for SSVEP-Based Brain-Computer Interfaces," Institute of Automation (IAT) Conference, Jun. 2009, pp. 706-713, Bremen, Germany.
(Continued)

*Primary Examiner* — Nitin Patel
*Assistant Examiner* — Corey A Almeida
(74) *Attorney, Agent, or Firm* — Matthew R. Osenga; Robin W. Edwards; Trenton J. Roche

(57) ABSTRACT

A brain-computer interface system includes a video processor for producing a display signal, a temporal controller for producing a plurality of repetitive visual stimulus (RVS) signals with different respective temporal aspects, a display device that receives the display signal and displays a corresponding image on a plurality of different display regions and receives the RVS signals and displays corresponding RVS in respective ones of the display regions, an electroencephalographic (EEG) sensor for sensing a visually-evoked cortical potential (VECP) signal in a user with eyes fixated on a viewed one of the display regions, and a VECP processor for processing the VECP signal to identify the respective temporal aspect of the respective RVS of the viewed display region to estimate the eye fixation location. The RVS are generated independently of the display update/refresh rate and at sufficiently high frequencies to avoid flicker perceptible to the user.

20 Claims, 12 Drawing Sheets

(56) References Cited

U.S. PATENT DOCUMENTS

| | | |
|---|---|---|
| 6,483,484 B1 | 11/2002 | Yamazaki et al. |
| 6,522,079 B1 | 2/2003 | Yamada |
| 8,793,620 B2 | 7/2014 | Stafford |
| 8,798,736 B2 | 8/2014 | Sullivan et al. |
| 10,062,334 B2 | 8/2018 | You et al. |
| 11,093,033 B1* | 8/2021 | Wang .................... G06V 40/18 |
| 2016/0282940 A1* | 9/2016 | Hong ...................... G06F 3/16 |
| 2023/0004222 A1* | 1/2023 | Ke ......................... G06F 3/147 |

OTHER PUBLICATIONS

Wang et al., "Visual Stimulus Design for High-Rate SSVEP BCI," Electronic Letters, Jul. 22, 2010, pp. 1-2, vol. 46, No. 15.

Jia et al., "Frequency and Phase Mixed Coding in SSVEP-Based Brain-Computer Interface," IEEE Transactions on Biomedical Engineering, Jan. 2011, pp. 200-206, vol. 58, No. 1.

Zhu et al., "A Survey of Stimulation Methods Used in SSVEP-Based BCIs," Computational Intelligence and Neuroscience, Jan. 2010, pp. 1-13, vol. 2010, Article ID 702357.

* cited by examiner

DISPLAY SYSTEM INTERFACE USING VISUALLY-EVOKED CORTICAL POTENTIALS

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND

A primary issue in human-machine interaction technology is improving the bandwidth of communication between the human and the machine. Barriers to communication exist for multiple reasons, including significant differences in communication speed and the machine's limited ability to sense and respond to nonexplicit human communication modes. Significant research has been conducted towards reducing this barrier in recent years. Systems have been explored which incorporate eye tracking, physiological monitoring, and monitoring changes in human behavior to modify the system behavior. For example, U.S. Pat. No. 6,483,484 entitled "Goggle Type Display System" by S. Yamazaki et al. (which is hereby incorporated by reference herein) describes display systems which include sensors to measure human vital information, such as pulse rate, blood pressure, or "eye congestion," and to automatically modify the information displayed when the values obtained from these sensors are not normal.

Eye-tracking devices typically apply optical means to determine the direction of human visual gaze to determine objects or regions of a display at which the user is looking. However, electroculograms can also be applied to measure electrical signals associated with muscle movements of eyes to determine movement of the eye. This information can then be used to aid the selection of objects using other input devices. For example, U.S. Pat. No. 5,649,061 entitled "Device and Method for Estimating a Mental Decision" by Christopher Smyth (which is hereby incorporated by reference herein) describes a system in which oculometric measurements and a head position and orientation sensor are used to determine the viewing direction of the user. Separately, an electroencephalographic (EEG) potential is measured from the scalp of the user to determine mental decisions of the user that are associated with the items the user is looking at on the screen as determined from the oculometric measurements. Similarly, U.S. Pat. No. 8,793,620 entitled "Gaze-Assisted Computer Interface" by Jeffrey Stafford (which is hereby incorporated by reference herein) discusses a computer interface in which the point of gaze of the user and mouse movement are employed to improve the efficiency of cursor movement in a computer system. As discussed in this patent, optical means often involve cameras or video systems. However, other methods for measuring eye movements can also be used, for example coils or electroculograms (EOGs), which measure the movement of an electric field or electrical fields created by the ocular muscles used to move the eye to change the point of gaze.

It is also known that when a user looks at a temporally modulated light source, a visually-evoked cortical potential (VECP) can be created in the visual cortex and measured using EEG measurements recorded from the brain's occipital lobe. As such, it is possible to measure the repetition of VECPs to determine correlation of a brain signal with temporally-modulated visual signals to determine which one of multiple repetitive visual stimuli (RVS) an individual's eyes are fixated on. These systems apply a series of lights which are flashed at different temporal frequencies to create multiple RVS. When the user focuses their visual attention on one of these lights, a steady-state visual-evoked potential (SSVEP) is created with a frequency near the frequency corresponding to the frequency of the focused-on RVS. This SSVEP is detected through EEG measurements of electrical potentials from the occipital lobe of the human brain. By comparing the temporal rate of the SSVEP with the temporal rates at which the lights are flashed, the system can then determine which of the flashing lights the user is attending. The SSVEP is reduced significantly as the user moves their point of gaze away from the flashing light, because this signal is measured in the visual cortex where the area of neurons dedicated to the processing of information imaged on the user's fovea is much larger than the area of neurons dedicated to the processing of information imaged on the peripheral areas of the retina. In these systems, the information must be focused on the user's fovea to elicit a strong signal. Therefore, the user must be focused on the visual stimulus to permit the stimulus to elicit a strong signal, which is believed to overcome a significant limitation of optically-based eye tracking devices. Specifically, these systems not only determine that the user's eyes are pointed to a location, but additionally determine that the user is focused and attentive to the information displayed within the region.

An example of such a system that has applied SSVEP to determine a user's point of gaze is U.S. Pat. No. 8,798,736 entitled "EEG Control of Devices Using Sensory Evoked Potentials" by Sullivan et al. (which is hereby incorporated by reference herein). This patent discusses a method for generating a stimulus-locked average signal of a plurality of EEG signal samples and applying this signal to determine which of several possible stimulus signals most closely match the EEG signal samples to determine which of a plurality of light sources the user is viewing. Unfortunately, these systems have been limited to the use of a small number of light sources because these values are selected such that they are a factor of the display refresh rate and therefore only a limited number of RVS can be generated on traditional displays. These RVS typically have a duty cycle (i.e., the ratio of time activated to emit light to the time not activated to emit light) that is significantly less than 1. The frequencies at these factors produce very visible flicker when the display is driven with a duty cycle appreciably less than 1 (because these light sources are constrained to flash at a low temporal rate). Therefore, these systems have generally been limited to use by disabled individuals who are incapable of using traditional computer interaction devices and for whom these systems provide significant advantage. For example, paraplegics who apply this technology to control the direction of wheelchair movement.

Current visual display technology includes liquid crystal displays (LCDs) and LED displays, including organic light-emitting diode (OLED) displays. In the typical liquid crystal display, a light source is used to backlight a liquid crystal display and the liquid crystal display is modulated in response to a data signal to permit light to pass from the backlight to the user's eyes. Typically, the backlight is turned on at a constant luminance and remains on. Recently, some liquid crystal displays have begun to employ arrays of short-wavelength LEDs which are turned on to illuminate a film coated with quantum dots. Typically, these LEDs are turned on and remain on at full power. However, recently some liquid crystal displays have begun to employ a light source that is dimmed. For example, U.S. Pat. No. 10,062,334 entitled "Backlight Dimming Control for a Display Utilizing Quantum Dots" by You and Drolet (which is hereby incorporated by reference herein) discuss an LCD display with an LED backlight wherein the duty cycle or the drive current of the LEDs in the backlight are controlled to dim the backlight behind the display.

OLED displays have been created that emit light that is directly perceived by the human observer. These displays may be driven using digital drive or passive matrix circuitry in which the duty cycle is modulated to affect the luminance output of each pixel in response to a data signal. For example, U.S. Pat. No. 6,023,259 entitled "OLED Active Matrix using a Single Transistor Current Mode Pixel Design" by Webster and Prache (which is hereby incorporated by reference herein) discusses an OLED drive method in which the duty cycle of a pulse-driven OLED display is modified to control the luminance of each pixel in the display. In these displays, the frequency at which these displays are updated is fixed, while the duty cycle (i.e., proportion of time the signal is on) is modified by changing the amount of time that each pixel is on as compared to the total time that any pixel could be on. Alternatively, OLED displays can be driven using an analog drive technique in which each pixel is turned on to a different level in response to the data signal during each display refresh. For example, U.S. Pat. No. 6,522,079 entitled "Electroluminescence Display Device" by Yamada (which is hereby incorporated by reference herein) discusses an OLED display where each row or column of OLEDs within the display is driven with a data line for delivering the data signal and each pair of rows or column of OLEDs share a power line where thin-film transistors are connected to each of these lines and modulate the flow of power from the power line through the OLEDs to modulate their luminance in response to the data signal provided on the data line. In this design, analog OLED displays produce light anytime a high data signal is provided on the data line and power is provided on the power line.

Regardless of the technology, traditional desktop displays are typically updated at a fixed rate as data is provided to the display. Common data update rates are 24 Hz, 30 Hz, or 60 Hz, indicating that a data signal is delivered to each pixel on the display at a frequency of 24 Hz, 30 Hz, or 60 Hz. To implement a brain-computer interface on a traditional display, the data signal is modulated to cause spatial display regions of pixels within the display to flash. However, the frequency of modulation provided through this type of interface is typically limited to frequencies that are factors of the standard refresh rate, as discussed by Volosyak et al. in the paper entitled "Impact of Frequency Selection on LCD Screens for SSVEP-Based Brain-Computer Interfaces." This paper discusses the use of two sets of 5 frequencies at which a portion of the data signal can be modulated to create five separate RVS on a typical LCD. As mentioned before, the frequencies of the RVS are much lower than the update rate of the display, providing RVS which result in five stimuli, all of which are visibly flickering at a different frequency.

It has been shown that non-integer values can be used to generate the RVS, as discussed by Wang et al. in the paper entitled "Visual Stimulus Design for High-Rate SSVEP BCI." However, the number of frequencies remain quite limited and are limited to low frequencies (30 Hz or less), most of which are visibly flickering. Other approaches have been developed to permit the modulation of the data signal to create more RVS which result in discriminable changes in steady-state visually-evoked potentials (SSVEPs), which are generated in the occipital lobe when a user views an RVS. For instance, the paper by Jia et al. entitled "Frequency and Phase Mixed Coding in SSVEP-Based Brain-Computer Interface" discusses the use of changes in both frequency and phase of the RVS to code different information and then recover this information from the SSVEP signal during analysis of the EEG signal. Once again, however, the number of selections are limited and each of the stimuli are updated at a low frequency, resulting in visible flicker. As a result, it is acknowledged that SSVEP signals presented on traditional display devices, such as LCDs, enable the creation of useful RVS at only a few frequencies and limit the range of frequencies to frequencies that present visible flicker, as discussed in the literature review article by Zhu et al. entitled "A Survey of Stimulation Methods Used in SSVEP-Based BCIs." This fact imposes a limitation on the number of available stimuli which can be presented on a display within an SSVEP-based brain-computer interface when using typical display systems and limits the application of these devices to users who are willing to suffer from the visible flickering stimuli presented in these computer interfaces.

Accordingly, these and other needs exist for improvements in brain-computer interface systems to provide a large number of potential eye fixation locations without producing visible flicker.

BRIEF SUMMARY

Generally described, the present invention relates to a brain-computer interface system and operational method in which a plurality of repetitive visual stimuli (RVS) are natively generated by a visual display based for example upon the physical construction of the display system. As such, there is no need to embed the RVS signal in the image display carrier signal provided to the display system. In typical embodiments, the temporal aspect of the RVS is not limited by the update/refresh rate of the display device. As such, higher frequency RVS can be used (relative to the prior art), thus permitting the use of RVS which do not introduce flicker or other artifacts that are visually perceptible to the naked eyes of the user. As a result, the brain-computer interface system overcomes limitations of current brain-computer interface systems that rely on the use of RVS to generate a steady-state visually-evoked potential (SSVEP).

These and other features, advantages, and objects of the present invention will be further understood and appreciated by those skilled in the art by reference to the following specification, claims, and appended drawings.

DETAILED DESCRIPTION OF THE INVENTION

Figure 1:
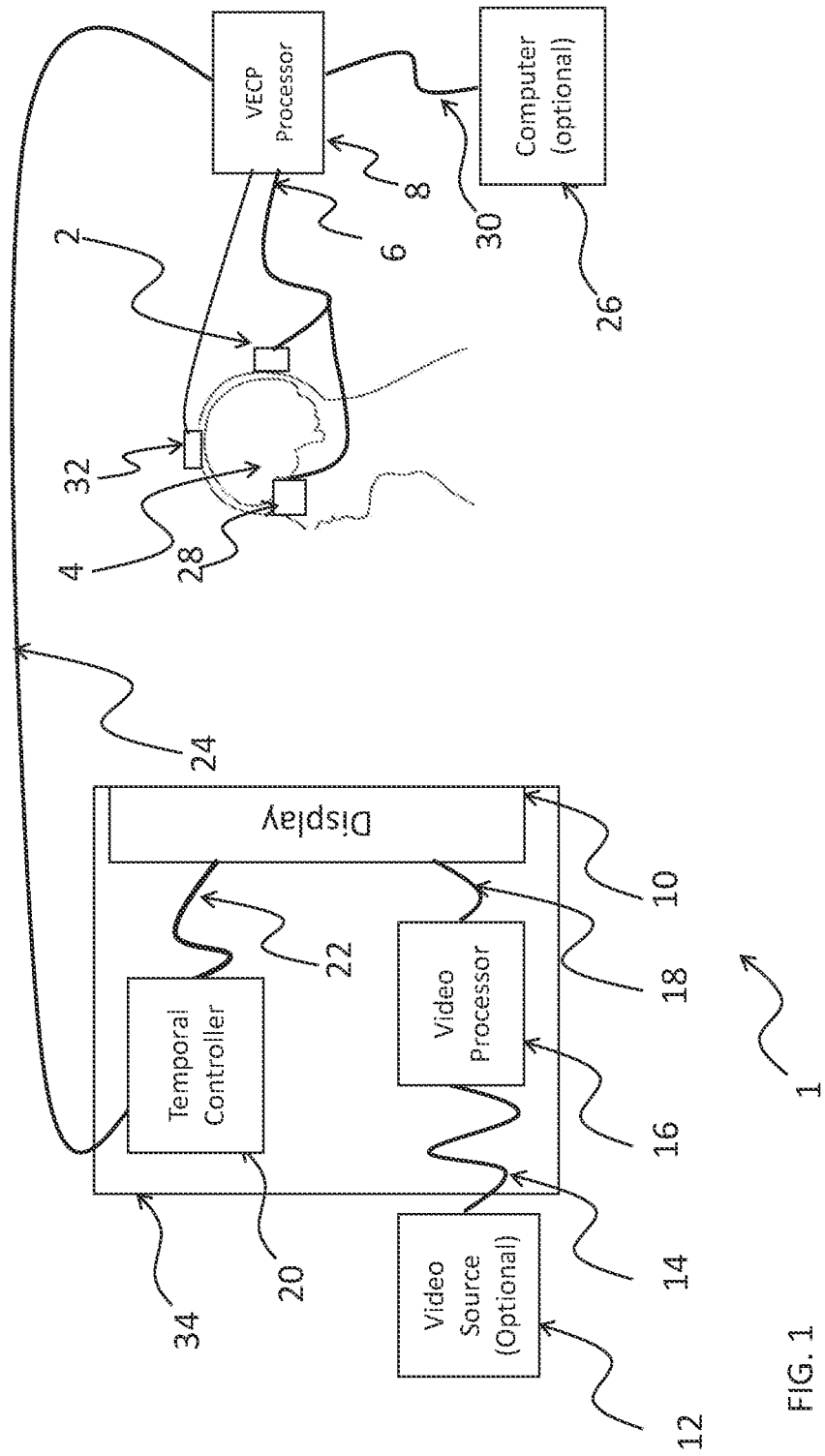
FIG. 1 is schematic diagram of a brain-computer interface system according to an example embodiment, showing a display device, a temporal controller for displaying RVS on the display device, EEG and EOG sensors for sensing stimulus signals in a user viewing the display device, and a VECP processor for processing the stimulus signals.
Figure 2:
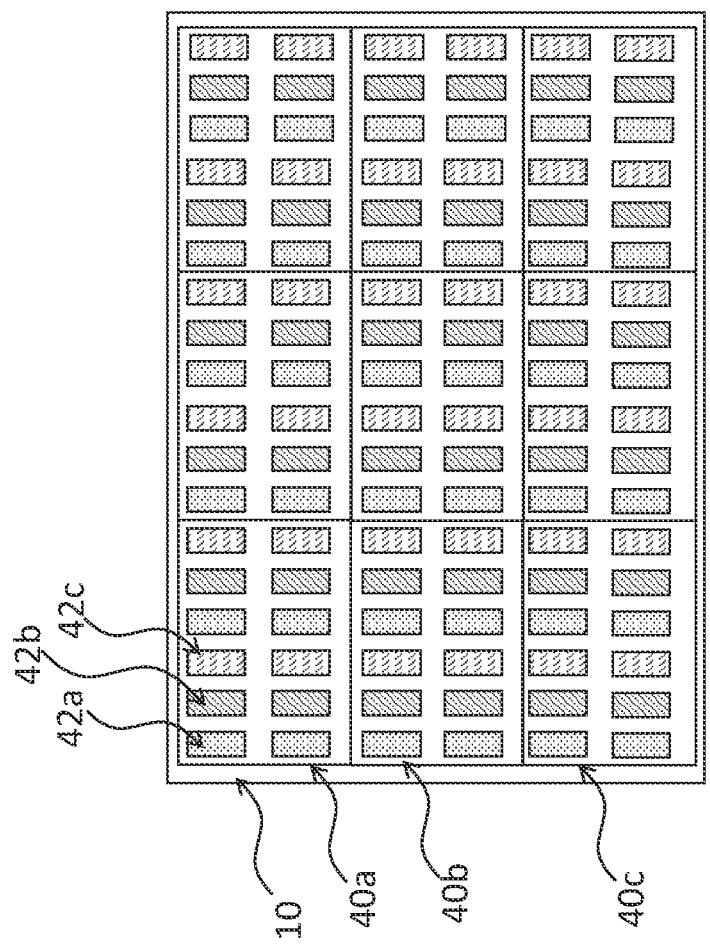
FIG. 2 is a front view of the display device of FIG. 1, showing multiple spatial display regions.
Figure 4:
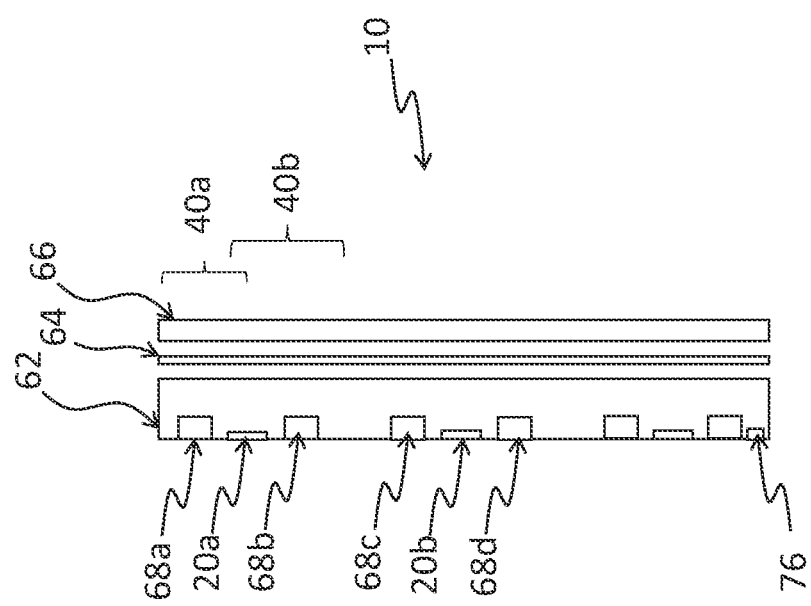
FIG. 4 is a side view of the display device of FIG. 2, showing the temporal controller as a distributed arrangement of dedicated temporal controllers.

For purposes of description herein, any use of the terms "upper," "lower," "right," "left," "rear," "front," "vertical," "horizontal," and derivatives thereof shall relate to the invention as oriented in FIGS. 1-2 and 4. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 schematically shows a brain-computer interface (BCI) system 1 according to an example embodiment of the invention. The brain-computer interface system includes a video processor 16 for producing an display control signal, a temporal controller 20 for producing a plurality of repetitive visual stimulus (RVS) signals with different temporal aspects, an electronic display device 10 that receives the display control signal and the RVS signals and displays corresponding images and RVS, one or more electroencephalographic (EEG) sensors 2 for sensing a visually-evoked cortical potential (VECP) signal in a user whose eyes are fixed on a viewed region of the display 10, and a VECP processor 8 for processing the VECP signal to identify the viewed one of the spatial display regions. The temporal controller 20 provides innovative functionality for independently generating and controlling the RVS signals. That is, the RVS signal is not embedded in the image signal provided by the video processor 16 to the display 10. Instead, the temporal aspect of the RVS is selected and controlled independently of the display control signal provided by the video processor 16.

Details of the BCI system and its method of operation 100 are described below. It should be noted that in other aspects, the invention relates to the temporal controller, the display system including the display and the temporal controller, the VECP Processor, methods of operation of the temporal controller and the display system, and non-transitory storage devices storing instruction sets for performing these methods.

The one or more EEG sensors 2 measure VECP signals from the occipital region of the human brain 4. The VECP signals are created in response to a cyclic, repeating visual stimuli (e.g., a sine or square wave function) and are commonly referred to in the literature as steady-state visually-evoked potentials (SSVEPs). As used herein, SSVEP signals are not distinct from VECP signals and are referred to herein as VECP signals. Other EEG sensors 32 may be used to measure signals originating in other portions of the brain. The VECP signals are provided to the VECP signal processor 8 through a data connection 6 (e.g., a wire or wireless connection). The VECP signal processor 8 analyzes the VECP signal using VECP logic to produce an estimate of the eye fixation location on the display 10.

The analyzed VECP signal can be saved in a conventional data storage device. In the depicted embodiment, a separate (optional) computer 26 with a data storage device is provided for storing the analyzed VECP signal. The analyzed VECP signal can be provided to the computer 26 through a data connection 30 (e.g., a wire or wireless connection). In other embodiments, the VECP signal processor 8 is provided with a data storage device for storing the analyzed VECP signal. In such other embodiments, the optional computer 26 is not provided, or the VECP processor 8 is provided within the optional computer 26.

The VECP signal is produced in the human brain 4 in response to the RVS shown on the display 10. The display 10 includes a display screen with plurality of spatial display regions for displaying images and the RVS. The display 10 receives a display control signal through a connection 18 (e.g., a wire or wireless connection) from the video processor 16. The video processor 16 processes an image signal to produce the display control signal, which represents the image displayed on the display 10. The display 10 also receives a plurality of RVS signals from one or more temporal controllers 20, with the temporal controllers 20 providing different RVS to different respective spatial display regions 40 of the display 10. The temporal controller 20, the VECP signal processor 8, or both, can additionally communicate a temporal map which provides a description of mapping of the RVS to the spatial display regions 40 of the display 10 as part of a synchronization signal.

The electronic display device 10, the video processor 16, and the temporal controller 20 can be provided together in a display system 31. As such, the display system 34 includes the display device 10, the video processor 16 for receiving the image signal and generating the display signal to drive individual pixels within the display 10, and the temporal controller 20 for providing the RVS signals having different temporal aspects to the different respective spatial display regions 40 of the display 10, which can all be provided together in one housing.

In another embodiment, it is desirable for the VECP processor 8 to also be provided in the display housing 34. In such an embodiment, the VECP signal can be provided to the VECP processor through a wireless connection 6. In other embodiments, the VECP processor may receive VECP signals from the brains 4 of multiple people, permitting the VECP processor to simultaneously provide estimates of the human gaze location for multiple individual people. In another embodiment, the display 10 may be a head or helmet-worn display. In such an embodiment, it can be desirable to house the video processor 16, the temporal controller 20, and the VECP signal processor 8 in a separate housing than the housing 34 which contains the display in order to remove the heat, weight, and power requirements for these components from the user's head. In such embodiments, the EEG sensors 2, 32 and the optional eye movement sensors 28 can be mounted in the helmet or head band which holds the display housing 34 on the user's head. It will also be recognized that the temporal controllers 20, the VECP signal processor 8, and the video processor 16 require traditional logic gates and therefore the functionality of these three components may be physically instantiated in either a common or different application specific integrated circuits (ASICs), field programmable gate arrays (FPGAs), or general processing units (GPUs).

In the depicted embodiment, a separate (optional) video source 12 is provided for storing the image signal (or a library of different image signals) and providing the image signal (or a selected one of the image signals) to the video processor 16 through connection 14 (e.g., a wire or wireless connection) for processing to produce the display control signal. In other embodiments, the video processor 16 is provided with a data storage device for storing the image signal(s). The terms "image signal" and "display control signal" are intended to be broadly construed to include and provide for display of all types of data on the display 10. However, image signal will typically represent information provided in a standard format for display. This may include formats for television monitors, such as one of the High Definition Television Formats, one of the Ultra HD television formats or formats for computer output, such as the Super Extended Graphics array, Quad Extended Graphics Array or Quad High Definition standard formats. The display control signal will refer to a signal which is rendered by the video processor 16, specifically to the characteristics of the display 10.

The EEG sensors 2 can include any sensor system capable of measuring EEG signals (e.g., electrodes that measure an electrical impulse from the brain that represent the VECP signals). For example, the sensors 2 can be traditional wet sensors, which require gel to be placed between the user's scalp and the actual sensor, such as the wet sensors sold by BIOPAC as part of its EEGlOOC system for use with its MP150 EEG amplifier system. As another example, the sensors 2 can be dry sensors such as those marketed by COGNIONICS for use with its QUICK-30 dry EEG headset.

The sensors 2 are typically provided in a set, for example two or more sensors, though in some embodiments a single sensor can be used. For example, at least one sensor 2 can be located at the back of the skull in the occipital region to permit monitoring of the signals from the visual cortex, as depicted. Optionally, two sensors can be placed in left and right portions of the occipital region, with their respective measured VECP signals later processed together. Optionally, the sensors can be placed in other locations in the occipital regions for monitoring.

The sensors 2 typically also include a reference or ground, which may be located, for example, in contact with the mastoid region. In alternate arrangements, the reference electrode can be placed in the horizontal center of two or more of the sensors 2 when they are located over the left and right occipital lobes of the brain, such that the reference electrode is located approximately at the center between the left and right hemispheres of the brain. The sensors 2 typically also include an amplifier appropriate for amplifying the signal while isolating this signal from other electromagnetic signals within the environment and any oscillation in the signal produced from the main power supply.

In some embodiments, the system includes additional sensors. The depicted embodiment additionally includes eye movement sensors 28 for detecting blinks or movements of the user's eyes. For example, the eye movement sensors 28 can be electroculogram (EOG) sensors selected and configured to receive electrical eye-movement signals from the muscle groups that are responsible for the eye lid movements and/or eye movements As another example, the eye movement sensors 28 can be provided by optical sensors (e.g., including cameras) that detect the rotation of the user's eye within its eye socket. The eye-movement signals from the eye movement sensors 28 are additionally provided to the VECP signal processor 8 via the connection 6. The combination of the eye movement sensors 28 with the EEG sensors 2 is useful for the system to provide a high level of accuracy of the eye fixation location on the display 10, though in some embodiments and applications the use of the EEG sensors 2 alone (without the eye movement sensors 28) provides adequate precision.

The depicted embodiment also includes optional sensor 32. This sensor may include one or more EEG sensors which are used to record signals from other parts of the brain, for instance, the frontal cortex, which is often associated with decision making, or the motor cortex, signals from which usually occur when the user moves parts of their body Sensors located in the frontal cortex may provide signals for determining when the user makes a mental decision. The knowledge of this mental decision may be combined with an estimate of eye fixation location from the BCI system 2 to understand when a user makes a decision in response to information being displayed at the eye location. Similarly, signals from the motor cortex may be analyzed to determine when a body movement occurs and to associate this motion with eye location to understand when a user makes a movement in response to displayed information.

The VECP processor 8 can be provided by a conventional digital signal processing unit (including a combination of such units) capable of receiving the VECP signals from the EEG sensors 2 to determine an eye fixation location based upon the RVS on the display 10. And the VECP logic can be of a conventional type known in the art and implemented by programming for the VECP signal processor 8. The VECP processor 8 uses the VECP logic to perform signal processing to associate the temporal aspect of the RVS with a repetitive signal within the electrical VECP signal to determine the spatial display region (or regions) 40 on the display 10 that the user is fixated upon to provide an estimate of the eye fixation location.

In typical embodiments, the VECP processor 8 updates the eye fixation location without a perceptible delay, for example within 1 s of the onset of an eye fixation, preferably within 0.3 s of the onset of an eye fixation and more preferably less than 0.1 s after the onset of an eye fixation. In embodiments including the eye movement sensors 28, the VECP processor 8 receives the eye-movement signals from the eye movement sensors 28 to determine the onset of an eye fixation and analyze the signals from the EEG sensors 2 to determine the eye fixation location on the display 10.

In addition, the VECP processor 8 typically also receives a synchronization signal from the temporal controller 20 across connection 24 (e.g., a wire or wireless connection or communications interface). The synchronization signal enables the VECP processor 8 to determine the temporal aspect of the RVS that is presented to the user by the spatial display regions 40 within the display 10. The synchronization signal enables the VECP processor 8 to understand the RVS at each spatial location 40 on the display 10 as controlled by the temporal controller 20. This synchronization signal provides a description of the RVS at each relevant area on the display 10. For example, the synchronization signal may provide a numeric representation of each spatial display region 40 on the display 10 or define these spatial display regions in terms of coordinates of blocks of pixels on the display and a description of the RVS with each region. This description of the RVS may include the type of waveform (e.g., square wave, sine wave, impulse function), a depiction of the duration or duty cycle of the signal, and an indicator of the frequency and phase of steady state or repeating waveforms. Optionally, the synchronization signal may include a clock signal permitting the temporal synchronization of the VECP processor 8 and the temporal controller 20. This temporal signal permits the VECP processor to understand the RVS that is applied at each spatial location on the display, including determining the phase of the VECP signal.

The VECP processor then compares the measured VECP signal to each RVS produced within each spatial display region 40 of the display 10 in response to the temporal controller 20. When the RVS is found as described in the synchronization signal which matches the VECP signal, the spatial display region 40 of the display 10 having the corresponding RVS is identified and output by the VECP processor 8 to indicate the estimate of the user's eye location on the display 10. If the VECP signal is found to correspond to more than one RVS, the VECP processor may output an intermediate location to the locations in the synchronization signal that are identified with the corresponding RVS, or the VECP processor may output more than one spatial location. It can also be desirable for the synchronization signal to be bi-directional with the VECP processor 8 providing an estimate of the eye location and its accuracy to the temporal controller 20, which can then employ this information to decide how to allocate RVS signals to spatial regions 40 on the display. For example, the temporal controller 20 may provide the same RVS signals to multiple spatial locations on the display 10 which are distant (or at least non-adjacent) from the estimate of the eye location and different RVS to each different spatial location near the estimate of the eye location to enhance the resolution of the VECP processor's estimate of the eye location. In another embodiment, the VECP processor may provide requests for particular mappings of RVS signals to spatial locations on the display 10 by specifying spatial location of a particular RVS, as well as the type of waveform (e.g., square wave, sine wave, impulse function), a depiction of the duration or duty cycle of the signal, and an indicator of the frequency and phase of steady state or repeating waveforms to the temporal controller 20 through the synchronization signal.

Referring to FIG. 2, the display device 10 can be a conventional type of electronic display device, for example a liquid crystal display (LCD or LC display), an organic light emitting diode (OLED) display, or an inorganic light emitting diode display. The display device 10 is capable of outputting light with different RVS at different spatial regions 40 in response to the signal 22 from the temporal controller 20. The display 10 is operable to display an array of pixels 42*a*, 42*b*, 42*c*, etc. (collectively, the pixels 42) for emitting light to form the displayed images (including a single image or a series of images forming a video). The pixels 42 can be provided for emitting the same color light or for emitting different colors of light. For example, the depicted display 10 has a red pixel 42*a* for emitting red light, a green pixel 42*b* for emitting green light, and a blue pixel 42*c* for emitting blue light. In other embodiments, the pixels 42 can emit additional or alternative colors of visible light.

In addition, the display 10 is divided into a plurality of different spatial display regions. In the depicted embodiment, the display 10 is divided into an array of nine different spatial display regions 40*a*, 40*b*, 40*c*, etc. (collectively, the display regions 40). In other embodiments, the spatial display regions are not in a regular arrayed arrangement, for example the display can be divided into smaller display regions in the center portion of the display and larger spatial display regions on the periphery of the display, or the display can be divided into an irregular arrangement of spatial display regions.

Each different spatial display region 40 is capable of displaying an RVS with a different respective temporal aspect. For example, the temporal aspect of the pixels 42 within spatial display region 40*a* can differ in terms of frequency, phase, shape, duty cycle or amplitude from the pixels 42 within spatial display region 40*b*. The VECP signal processor 8 can then extract a temporal signal from the VECP signal received from the EEG sensor 2 and identify the respective spatial display region 40 of the electronic display 10 displaying the corresponding temporal aspect to determine the spatial display region 40 that the user is looking at. The temporal controller 20 provides different RVS signals corresponding to the different temporal aspects to the respective display regions 40 through a connection (e.g., a wire or wireless connection or communications interface) 22 to cause the display regions 40 of the display 10 to produce the desired RVS with the different respective temporal aspects.

While different RVS are provided to different display regions 40 to determine the RVS which corresponds to the VECP signal and to determine the approximate eye fixation location, it can be desirable for the temporal controller 20 to provide the same RVS to multiple display regions 40 which are either neighboring or distant from one another. As most eye movements are made over small distances and are often repeated, providing the same RVS to multiple neighboring spatial display regions which are distant from the estimate of the user's eye gaze position reduces the number of unique RVS which are required but permits the system to estimate the approximate eye gaze position when the user makes a large eye movement. For example, if the estimated eye gaze location is near the left edge of the display 10, the spatial display regions 40 on the right portion of the display 10 can be provided the same RVS. When the VECP signal processor 8 determines that the VECP signal corresponds to the RVS displayed in right-side display regions 40, the system can determine that the user has shifted their point of gaze to some area on the right side of the display 10. Providing the same RVS to multiple spatial display regions 40 which are distant from one another also reduces the number of unique RVS which are required but permits a relatively precise estimate of the eye location when the eye movement sensors 28 can be relied upon to determine when a large eye movement is made. For example, if it is known that the user is looking at a spatial display region 40 at the bottom left of the display 10, the same RVS for that region 40 may be applied to a spatial region 40 at the upper right of the display 10. In the case where the eye movement sensor 28 indicates small eye movements are occurring and the VECP signal processor 8 determines that the VECP signal corresponds to the RVS provided to lower-left and upper-right spatial regions 40, the system may continue to indicate that the user is looking at the lower-left spatial region 40. However, if the eye movement sensor 28 indicates that they user's eye has moved by a large distance in the horizontal and vertical directions, and the VECP signal processor 8 determines that the VECP signal corresponds to the RVS presented in both regions 40, the VECP signal processor 8 can determine that the user is fixating in the upper-right region 40.

As previously noted, the video processor 16 provides a display control signal to each pixel 42 to produce the image on the display 10. The RVS signals generated by the temporal controller 20 and the display control signals provided by the video processor 16 are not dependent upon each other. That is, to produce a temporally-modulated luminance pattern (i.e., RVS) and the same displayed image within two separate spatial display regions 40, the video processor 16 can provide an equivalent display control signal to both spatial display regions 40, but the temporal controller 20 will provide different RVS signals to the two display regions.

The video processor 16 can be provided by a conventional digital signal processing unit (including a combination of such units) capable of producing the display control signals for providing to the display 10 to produce the displayed images. And the temporal controller 20 can be provided by a digital signal processing unit (including a combination of such units) capable of producing the RVS signals for providing to the display 10 to produce the RVS. But the video processor 16 and the temporal controller 20 are two different and discrete processing units that typically are independent of each other and that are each programmed for their respective purposes as described herein.

As previously noted, the video processor 16 receives the image signal, for example from the optional video source 12, which can optionally be provided within the optional computer 26 or controlled by the optional computer 26 in some embodiments, though this control is not required and the optional video source 12 can be independent of the computer 26, for example provided by television broadcast or over an internet connection. In some embodiments, the optional computer 26 can be any device containing a general processing unit capable of storing or initiating actions based upon the eye gaze position received from the VECP processor 8. Further, in some embodiments the VECP processor 8 and/or the optional computer 26 are housed together with the display system 30 in a single electronic device, such as a laptop, tablet, or cellular telephone.

Figure 3A:
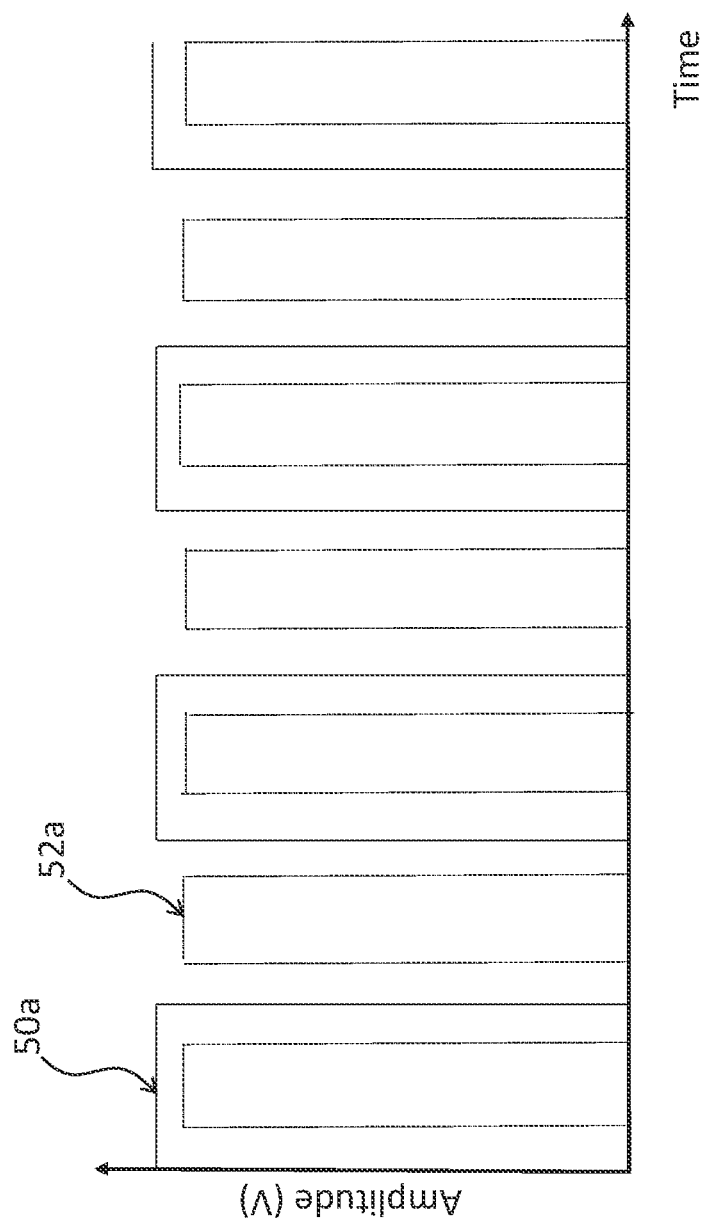
FIGS. 3a-c are each a plot of two different RVS signals having two different temporal aspects for displaying in two different respective display regions of the display device of FIG. 2.

Referring to FIG. 3a, the temporal controller 20 provides an RVS signal having a family of temporal aspects to all of the light-emitting elements or pixels 42 within the spatial display regions 40 of the display 10 and a different RVS signal having a different temporal aspect to all of the light emitting elements or pixels 42 within a different spatial display region 40b, 40c so that the different spatial display regions 40a and 40b, 40c present a different respective RVS to the user. As such, the temporal RVS signals each have a different respective temporal aspect, for example, as shown by the two example temporal RVS signals 50a and 52a in which the temporal aspect is the RVS signal frequency. The first temporal RVS signal 50a is half the temporal frequency of the second temporal signal 52a, that is, it produces half as many square waves within the same time period as the second temporal signal 52a. Also, the first temporal signal 50a is greater/higher in amplitude than the second temporal signal 52a. Finally, the phases of the first temporal signal 50a and second temporal signal 52a are different, illustrated by the fact that the onset of the maximum amplitude is shifted between the two temporal signals 50a and 52a.

In some embodiments, the temporal aspects are only one or two of the frequency, amplitude, duty cycle, shape, or phase of the RVS signal. In other embodiments, the temporal aspects are different signal characteristics in different display regions 40, for example the temporal aspect can be RVS signal frequency for one region and RVS signal amplitude for another region.

In other embodiments, the temporal aspects are other RVS signal characteristics and/or combinations of that can be used to differentiate the RVS signals and produce an EEG response in the user's brain. For example, the temporal aspects can provide the needed differentiation in other ways, for example the temporal RVS signal for one display region 40 might be the convolution of the first temporal RVS signal and the second temporal RVS signal, creating a complex wave form containing two frequencies. In other embodiments, the temporal aspects can be any repetitive wave form and can take the shape of a truncated sine or cosine waveform, rather than a square wave, where some portion of the negative lobe of the sine or cosine wave form is truncated at zero or some amplitude greater than zero.

In addition, the example temporal RVS signals 50a and 52a of FIG. 3a each have a 50% duty cycle, that is, each of the signals 50a and 52a is on for half of the possible time. However, this 50% duty cycle is not required and different duty cycles less than 100% can be used. Further, the duty cycle of the temporal RVS signals can be selected to modify the luminance of the display.

The temporal RVS signals 50a and 52a each have a frequency that is high enough to avoid the visual perception of flicker on the display 10 and yet low enough in frequency to provide a detectable VECP signal. For example, the frequencies of the temporal RVS signals are typically between about 30 Hz and about 120 Hz, more typically between about 40 Hz and about 80 Hz, and preferably between about 45 Hz and about 55 Hz. Further, because the frequencies of the temporal RVS signals are independent of the update/refresh rate of the display 10 (as set by the display control signal provided to the display 10 by the video processor 16), the temporal RVS signal can be equal to, higher, or slightly lower than the update or refresh rate of the display 10. In typical embodiments, the frequencies of the temporal RVS signals will be greater than one half the update or refresh rate of the display control signal.

Figure 3B:
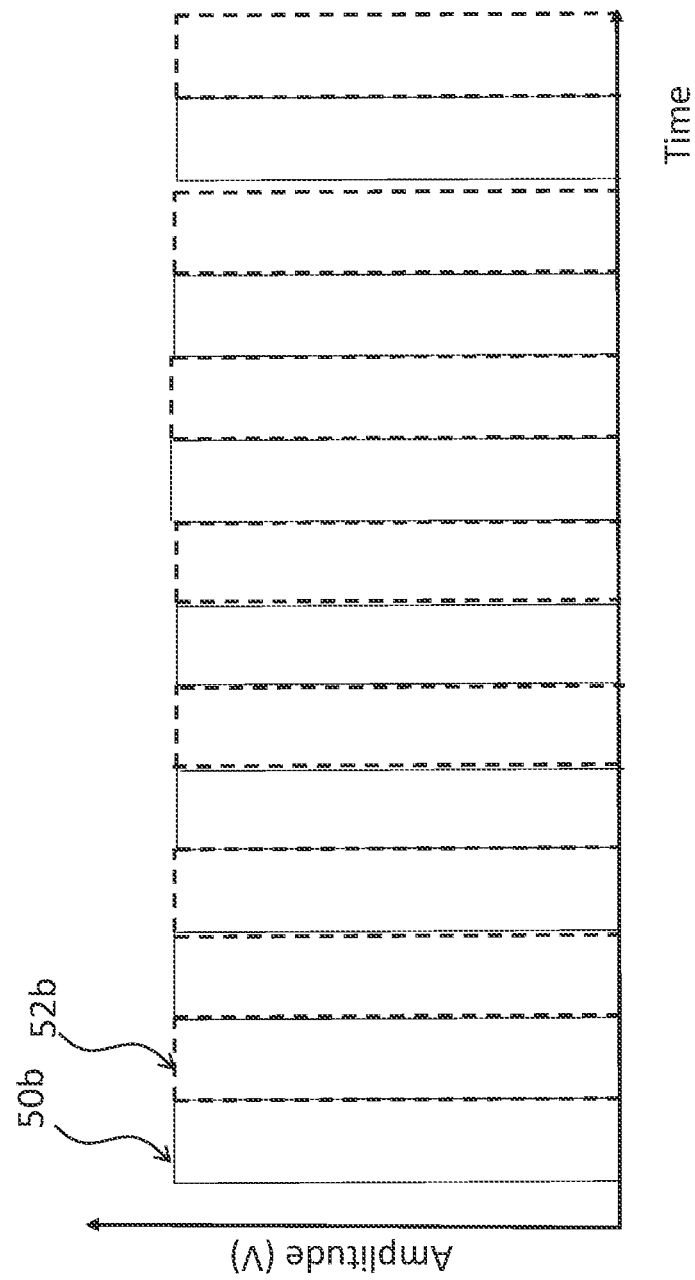

In some embodiments, the temporal controller 20 may provide RVS having the same frequency to multiple display regions 40 of the display 10 but change another temporal aspect (e.g., shape, amplitude, phase, frequency, duty cycle) of the RVS signal within these display regions 40 for use in determining the eye fixation location. For example, the RVS 50b shown in FIG. 3b in a first region where the RVS 50b is a square wave with a 50% duty cycle where the signal turns on one quarter of a full cycle of the wave form (i.e., 90 degrees) from the zero time point. A second RVS 52b is also a square wave having the same amplitude as 50b and a 50% duty cycle but is 180 degrees out of phase, such that this signal turns one three-quarters of a full cycle of the waveform (i.e., 270 degrees) from the zero time point. This RVS 52b produces a VECP signal that is identifiably different from the RVS signal 50b, however, the display 10 will constantly produce light having an equal amount of luminance across the regions in which RVS signals 50a and 50b are displayed when these regions are of equal area. Thus, the use of RVS with a phase shift as illustrated in FIG. 3b will be less likely to produce the perception of flicker.

Figure 3C:
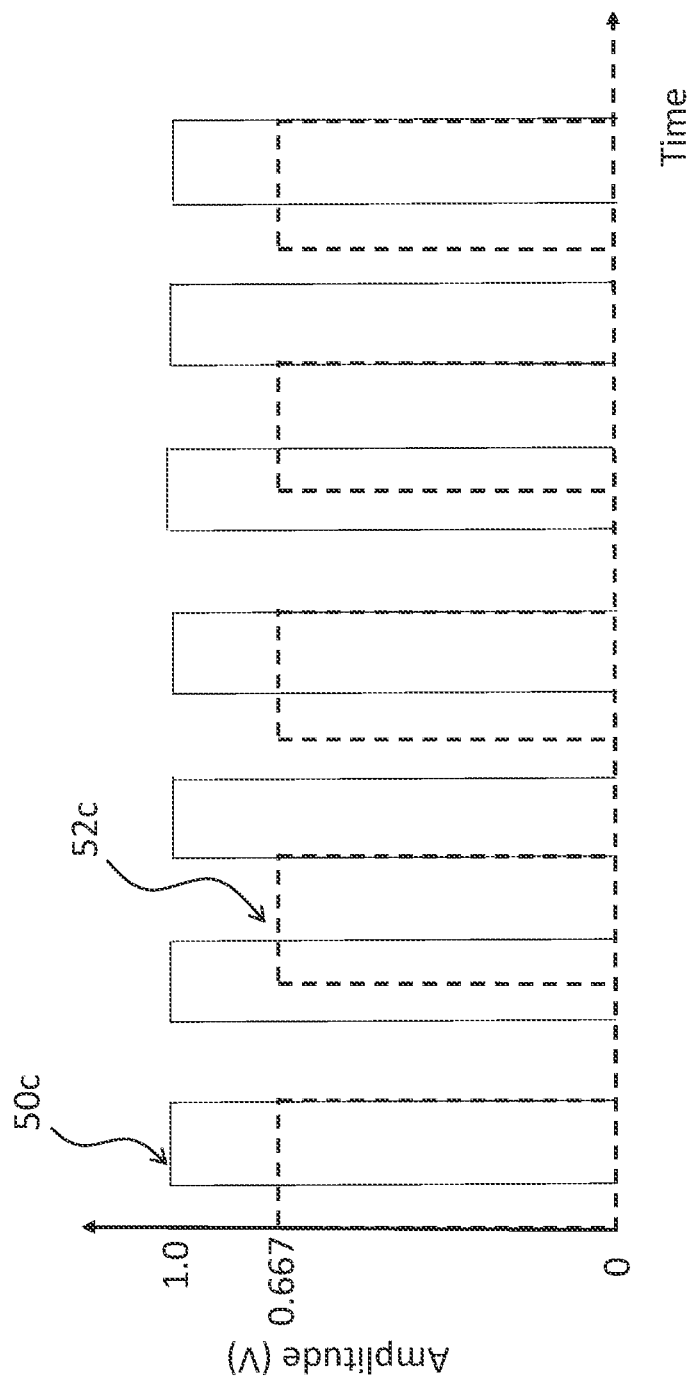

In another embodiment, the RVS 50c shown in FIG. 3c will be presented in a first spatial display region 40a where the RVS 50c is a square wave with a 50% duty cycle with an amplitude of 1.00. The second RVS 52c is a square wave with a 75% duty cycle but an amplitude of 0.667 with the same frequency and phase as the RVS 50c and this RVS will be displayed in a second spatial display region 40b. As illustrated in this example, it is desirable that the time integrated area under the RVS 50c and RVS 52c are equal to maintain equal light output from the display regardless of the RVS signal applied. Note that RVS signals 50c, 52c, may have various combinations of the temporal aspects to include changes in amplitude, phase, frequency, and duty cycle to produce different RVS signals at different spatial regions on the display 10. These combinations will ideally be manipulated to maintain nearly equal time averaged luminance output from the display over groups of neighboring spatial regions and that the area under each individual RVS signal be manipulated to be equal such that the display will produce equal luminance when an equal signal is provided by the video processor 16 to the spatial regions on the display 10.

It is not required, however, that the area under each individual RVS signal be manipulated to be equal such that the display will produce equal luminance when an equal signal is provided by the video processor 16 to the spatial regions on the display 10. Instead, the video processor 16 can be designed receive the image signal (or a selected one of the image signals) and then alter the processing applied to the image signal in response to differences in display luminance output which occur due to differences in the RVS signal. That is, the display control signal to be provided to different regions 40 of the display 10 can be manipulated to compensate for differences in luminance which is produced by differences in the RVS signal within different spatial regions 40 of the display 10. As such the video processor 16 when presented with a single display control signal to be displayed in two separate spatial regions (e.g., 40a and 40b) of the display 10 will produce different display control signals to compensate for the difference in luminance output of the display which is caused by differences in the RVS signal.

Referring to FIG. 4, the display 10 can be a LC display including an LC display module 66. The LC display module 66 includes an array of liquid crystal pixels for displaying the image based on the display control signal. The LC display module 66 typically also includes a color filter array and a pair of polarizing films as is well known in the art. The display 10 can optionally include a quantum dot layer 64 for converting short wavelength blue or near ultraviolet light to red and green light. The quantum dot layer 26 can include films such as those provided by 3M and described by Van Derlofske et al. in their paper "Quantum Dot Enhancement of Color for LCD Systems."

The display 10 can additionally include a backlight 62 for producing the RVS based on the temporal RVS signals. In the depicted embodiment, the backlight 62 includes an array of LEDs 68a, 68b, 68c, 68d, etc. (collectively, the LEDs 68) for emitting light, for example white, blue, and/or ultraviolet light. The LEDs 68 can be traditional inorganic LEDs or organic light emitting diodes.

Each LED 68 illuminates a different spatial display region 40 on the LC display module 66 (e.g., by illuminating a different spatial region of the optional quantum dot layer 64, which in turn emits light that illuminates the corresponding spatial display region 40 on the LC display module 66). The illuminated display region 40 on the LC display module 66 contains a two-dimensional array of the pixels 42. In this way, the first LED 68a can illuminate a first spatial region on the optional quantum dot layer 64, which emits light that illuminates the corresponding first spatial display region 40a of the LC display module 66. And the second LED 68b can illuminate a second spatial region on the quantum dot layer 64, which emits light that illuminates the second spatial display region 40b of the LC display module 66.

In the depicted embodiment, the temporal controller 20 is provided by an array of temporal controllers 20a, 20b, 20c, etc. (collectively, the temporal controllers 20) in a distributed arrangement and housed together with the backlight 62. Each of the temporal controllers 20 controls the amplitude of power (voltage or current) as a function of time to produce the temporal RVS signals which are provided to one or more adjacent or neighboring LEDs 68 causing the LEDs to produce light which varies as a function of time according to the RVS. For example, a first temporal controller 20a can control LEDs 68a and 68b, while a second temporal controller 20b can control LEDs 68c and 68d. The temporal controllers 20 are connected to a power supply and can be connected to the VECP signal processor 8 through the connection 24.

When the temporal controller provides a current or voltage to produce an RVS, such as 50a, this signal will cause the LEDs to produce light output that varies as a function of time such that the luminance produced by the LED as a function of time will increase as the RVS increases and decrease as the RVS decreases, creating light output which varies as a function of the RVS. Thus when the user looks at the spatial region of the display, for example 40a, which is illuminated by the LED or LEDs which are driven by the RVS 50a, the light output from the display will register on the fovea of the user's eye. This RVS will stimulate the cones in the user's eye to respond with a temporal output which corresponds to the RVS and this temporally varying signal will travel along the optic nerve to the occipital lobe of the human brain where the electrical signal will be magnified such that it can be measured by the EEG sensor to create the VECP signal. This VECP signal will have temporal aspects which are similar to the temporal aspects of the RVS, permitting the VECP processor 8 to determine these temporal aspects and match them to the temporal aspects of the RVS 50a. With knowledge that the RVS 50a was presented in spatial display region 40a as provided by the synchronization signal, the VECP processor can determine that the user is fixating or looking at spatial display region 40a and convey this information to an external device, such as the computer 26.

As noted, the display 10 can be incorporated into the display system 34 with the video processor 16. As such, the display system 34 is capable of receiving the image signal and creating the visual image on the display 10 in response to the image signal, with the display system 34 including the video processor 16 for receiving the image signal and producing the display control signal that causes the display 10 (for example, the LC display module 66 of the depicted embodiment) to emit light from the individual pixels 42 as a function of the image signal to produce the displayed image. Therefore, the LC display module 66 includes the different display regions 40 for producing the RVS created by the LEDs as modulated by the different temporal RVS signals having the different temporal aspects provided by temporal controllers 20. As such, the LC display module 66 includes the first spatial display region 40a for producing the first RVS created by the respective first LEDs 68a as modulated by the different temporal RVS signals having the different temporal aspects provided by first temporal controller 20a. And the LC display module 10 also includes the second spatial display region 40b for presenting the second, different RVS by modulating the temporal aspect of the second LED 68b. As noted, each of the spatial display regions 40 includes multiple individual pixels 42. As each of the first and second LEDs 68a and 68b is driven by the first temporal controller 20a, the display system 34 includes one or more controllers 20 for controlling a temporal aspect of the first and second RVS by controlling the temporal aspect of each LED 68a and 68b, such that each has a different temporal aspect.

In embodiments such as depicted in FIG. 4 with an array of the temporal controllers 20 that individually power/drive the LEDs, a significant amount of power will be required for the LEDs to emit adequate luminance. To control this level of power, it is necessary to fabricate the temporal controller(s) 20 to provide adequately high power. This may require the use of technology such as Silicon On Insulator (SOI) to modulate the power at adequate levels to provide the input voltage and current to the LEDs. Unfortunately, this technology is less common and more costly than traditional low voltage devices constructed with thin film transistors such as Complementary Metal Oxide Semiconductors (CMOS). Further, the logic necessary to select and produce the RVS can be complex further increasing the cost of temporal controllers 20 constructed on SOI. Therefore, the function of the temporal controllers 20 can be divided between a power circuit 76 (e.g., included as a part of the backlight 62) which is formed using a technology suitable for high power applications such as SOI to modulate the flow of power to the LEDs 68 differentially in response to a timing signal to generate an electronic signal capable of causing each LED to produce an RVS with a different temporal aspect and the temporal controllers 20 which are created in a less expensive, low power process such as CMOS to create the RVS which stimulates the power circuit 76 to produce power output according to the RVS.

A similar embodiment can employ an electroluminescent display as the display 10, such as the one provided by Cok et al. in U.S. patent application Ser. No. 12/546,118, entitled "Controlling an Electronic Device using Chiplets", which is hereby incorporated herein by reference. In such embodiments, the technology of the Cok application can be applied by providing separate spatial display regions 40 that each include an array of pixels or light-emitting elements which are connected to a different CMOS chip where an array of CMOS chips are distributed across a substrate on which the display 10 is fabricated and the pixels connected to each CMOS chip compose a display region 40. The temporal controller 20 can then provide or command a different RVS to each CMOS chip causing the CMOS chip to command the pixels 42 to emit light with intensity that varies as a function of the RVS.

Figure 5:
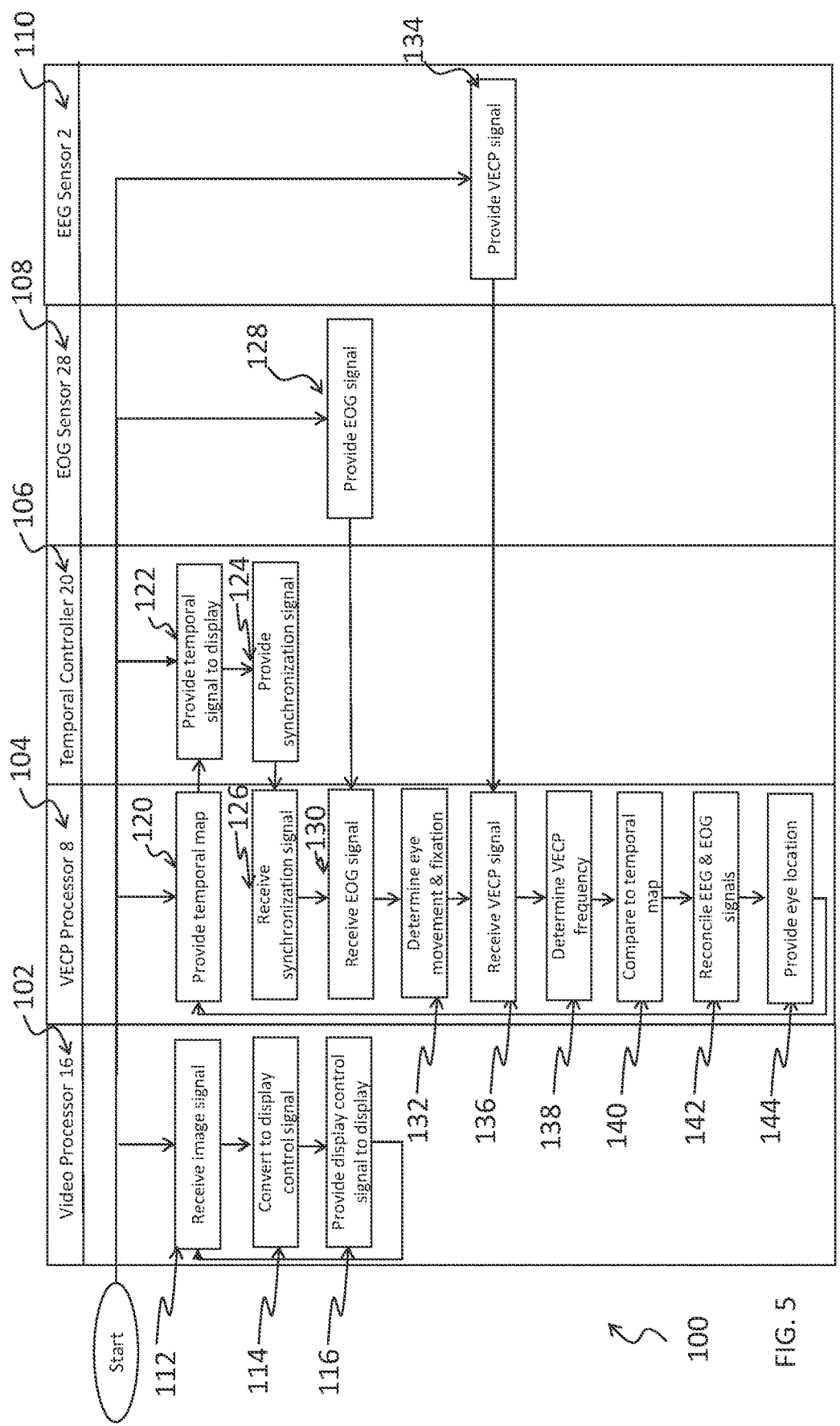
FIG. 5 is an activity diagram showing a process flow for operation of the brain-computer interface system of FIG. 1.

Referring to FIG. 5, an example process 100 will now be described for the operation of the brain-computer interface system 2. The process or activity diagram of FIG. 5 indicates activities performed by five components of the system 2, with each component shown in a different swim lane or column within the diagram. The five swim lanes include activities performed by the video processor 16 shown in swim lane 102, the VECP processor 8 shown in swim lane 104, the temporal controller 20 shown in swim lane 106, the optional EOG sensor 28 shown in swim lane 108, and the EEG sensor 2 as shown in swim lane 110. The process steps are implemented by instruction sets that are stored on storage devices and carried out by programmed processors of the individual components.

As shown in the process diagram, at start-up of the BCI system 2, all five components are powered on and activated. As noted above, the temporal processor 20 and the video processor 16 are two separate and distinct components that operate independently of each other. The video processor 16 functions in a conventional way, by receiving the image signal at 112, processing the image signal into the voltage display control signal at 114, and providing the display control signal to the display 10.

Separately and independently, the temporal controller 20 communicates with the VECP processor 8, which receives inputs from the sensors (e.g., the EEG sensor 2 and the EOG sensor 28), to assist the VECP processor 8 in determining the display region 40 the user's eyes are fixed upon. To provide this functionality, at 120 the VECP processor 8 communicates a temporal map to the temporal controller 20. The temporal map defines the display regions 40 and assigns a different and distinct temporal aspect to the RVS of each respective one of the spatial display regions 40 of the display 10. The temporal map provides a way of communicating changes in the spatial arrangement of the regions between the temporal controller 20 and the VECP processor so the VECP processor 8 can determine which RVS is provided in each spatial display region 40. After the VECP processor 8 determines the RVS that is creating the VECP signal, it can associate the RVS with the spatial display region 40 to determine the location of the eye movement. Additional details of the temporal map are described below with reference to FIG. 10

Next, the temporal controller 20 at 122 provides the temporal signal to the display 10, which causes the different spatial display regions 40 to each produce a respective one of the RVS having a respective one of the temporal aspects. So the display 10 then operates to display on the display regions 40 both the image (based on the display control signal received from the video processor 16) and the RVS (based on the temporal signal received from the temporal controller 20), with the RVS of each one of the display regions 40 having a respective different and unique temporal aspect from the RVS of each other one of the display regions 40.

Then the temporal controller 20 at 124 sends a synchronization signal that is received at 126 by the VECP processor 8. The synchronization signal indicates the onset of one of the pulses of the temporal signal to produce the RVS, permitting the VECP processor 8 to determine the exact onset of the RVS for each of the spatial display regions 40 of the display 10. Additional details of the synchronization signal are provided above.

In embodiments that provide for determining eye movement and/or fixation, such as that depicted, the EOG sensor 28 at 128 then sends the EOG signal, which is received at 130 by the VECP processor 8. The VECP processor 8 then processes the EOG signal at 132 to determine the onset of an eye movement and then to further determine the direction and magnitude of the eye movement.

This direction and magnitude can be used to estimate the fixation location of the eye on the display. The VECP processor 8 can then use this estimate to structure the comparisons it makes between the RVS temporal aspects and the temporal aspects of the VECP signal. For example, if the estimate indicates that the eye likely moved from spatial display region 40c to spatial display region 40b then the VECP processor 8 can compare the temporal aspects of the VECP signal to the RVS associated with spatial display region 40b, then it can confirm the eye fixation location and provide this estimate of the eye fixation location as its output. However, if the temporal aspects of the VECP signal does not match the temporal aspects of the RVS associated with spatial display region 40b then the VECP processor 8 can expand its search by comparing the temporal aspects of the VECP signal to the temporal aspects of the RVS associated with neighboring spatial display regions 40a, 40c, etc. until one is found with similar temporal aspects at which time the VECP processor 8 can report that spatial display region as the location of the visual fixation.

Additionally, the EOG signal can be analyzed to determine times that the eye is stationary or moving slowly, indicating times that it is fixating in a particular are, as opposed to times that the eye is moving rapidly between fixations. The VECP processor 8 can then disregard the periods of time where the eye is undergoing rapid eye movement and only analyze the VECP signal during the times that the user is fixating. Additionally, the EOG signal can be analyzed by the VECP processor 8 to determine times that the eyes are closed (i.e., the user blinks) and discard these time segments from the EEG signal to provide more robust matching between the temporal aspects of the VECP signal and the RVS.

Figure 6:
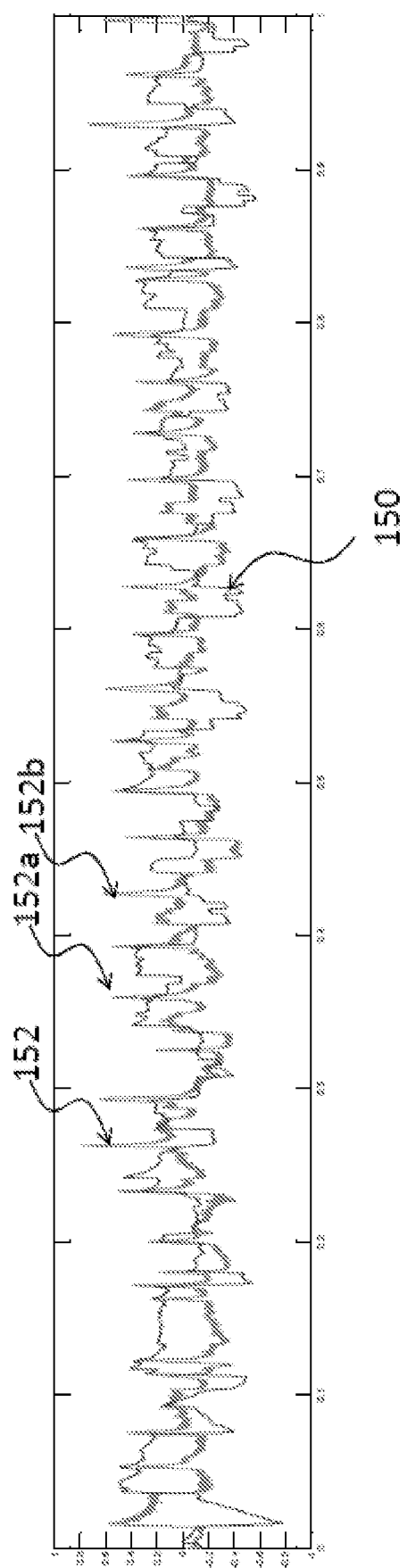
FIG. 6 is a plot of an EOG stimulus signal received from the EOG sensor and processed by the VECP processor according to FIG. 5.

FIG. 6 shows a representative example of the EOG signal and its processing by the VECP processor 8. As shown, the EOG signal typically contains both a horizontal EOG signal 150 and a vertical EOG signal 152 that vary as a function of time. The vertical signal 152 typically includes spikes 152*a* and 152*b*, which indicate blinks of the eye. Analysis of the EOG signals 150 and 152 by the VECP processor 8 thereby indicates when the eyes are closed, providing time segments which can be eliminated from the eye movement analysis.

In addition, the vertical and horizontal EOG signals 150 and 152 both include sudden changes in magnitude, which indicate muscle contractions that occur to cause the eyes to move. Analysis of the EOG signals 150 and 152 by the VECP processor 8 then provides an indication of the general direction and magnitude of the eye movement. Positive changes in the vertical EOG signal 152 typically indicate muscle contractions consistent with upward rotation of the eye, and negative changes in this signal 152 are consistent with and typically indicate downward rotation of the eye. Similarly, positive changes in the horizontal EOG signal 150 typically indicate rotation of the eye towards the right, and negative changes in this signal 150 are consistent with and typically indicate rotation of the eye towards the left. Also, the amount/magnitude of the positive and negative changes in the vertical and horizontal EOG signals 150 and 152 indicates the strength of the muscle contraction and is generally correlated with the amount/magnitude of the eye movement in the up/down and/or right/left directions.

Furthermore, transitions from a rapid change in one or both of the EOG signals 150 and 152 to a period of no change in both EOG signals 150 and 152 typically indicate the onset of an eye fixation, that is, a period of time when the eye is stationary, which typically indicates that the eye is focused on a location of a single display region 40 of the display 10. Analysis of the EOG signals 150 and 152 by the VECP processor 8 then provides an indication that the eye is now focused and fixated a single location of the display 10, with the previous eye-movement analysis providing an indication of one or more of the display regions 40 where the focused-on location is likely to be.

In some embodiments, the VECP processor 8 can perform more or less analysis on the EOG signal. For example, the VECP processor 8 can determine when there is eye fixation so that the process can continue with determining where that eye fixation is focused on the display 10.

In embodiments that do not provide for determining eye movement or fixation (for example, embodiments without the depicted EOG sensor 28), the process 100 skips steps 128, 130, and 132, and proceeds without having made this preliminary determination of eye movement or fixation. Regardless, the process 100 then continues on to processing the VECP signal.

The EEG sensor 2 then at 134 sends the VECP signal, which is received at 136 by the VECP processor 8. The VECP processor 8 then at 138 analyses the VECP signal to identify the temporal aspect (or aspects) of the VECP signal. As noted above, the temporal aspect of the RVS displayed by the display 10 can be for example the frequency of the RVS signal, in which case the VECP processor 8 analyzes the VECP signal and identifies the RVS frequency sensed by the EEG sensor 2. Additional features of step 138, which can optionally be included in the process, are described below with respect to FIGS. 7-9.

The VECP processor 8 then at 140 compares the identified temporal aspect to the temporal map to determine which one of the display regions 40 has the RVS with the identified temporal aspect. The identified display region 40 that displayed the identified temporal aspect is thereby determined by the VECP processor 8 to be an estimated location of the eye fixation on the display 10.

In embodiments that provide for preliminarily determining eye movement and/or fixation, such as that depicted, the VECP processor 8 then at 142 reconciles the VECP signal with the EOG signal to determine if the identified display region 40 determined based on the VECP signal is consistent with the likely or possible display regions(s) indicated based on the EOG signal. In particular, the reconciliation analysis provides confirmation of the eye fixation location by determining the spatial region 40 having an appropriate temporal aspect that is consistent with the general direction of eye movement. For example, if the analysis of the EOG signal indicates only one likely display region 40, and the analysis of the VECP signal indicates that same display region 40, then good confirmation is provided of the accuracy of the process 100. Or if the analysis of the EOG signal indicates multiple likely display regions 40, and the analysis of the VECP signal indicates a display region 40 that is a match to one of them, then possible confirmation is provided of the accuracy of the process 100 (and the preceding steps may optionally be repeated). But if the outcome of the analysis of the VECP and EOG signals is that there is no match, then the process 100 continues by repeating the preceding steps until a match is made.

In embodiments that do not provide for determining eye movement or fixation (for example, embodiments without the depicted EOG sensor 28), the process 100 skips step 142. Instead, the process concludes at 144 with the VECP processor providing an estimate of the eye fixation location on the display 10 based only on the analysis of the VECP signal at 140.

The process can then be concluded (e.g., for one-off applications such as making a single selection) or continued (for ongoing-use applications such as avionic displays of aircraft). For example, the process steps from 128 to 142 can be repeated a number of times before any further action is taken in order to obtain further confirmation of the accuracy of the process 100 (e.g., for one-off applications or ongoing-use applications). Also, after further action has been taken (e.g., automatic actuation of a device operably associated with the identified display regions 40) based on the identified display region 40 of eye focus, the process steps from 128 to 142 can be repeated as needed for the user to input additional selections as may be desired.

As noted above, the analysis of the VECP signal by the VECP processor 8 at 138 can include additional processing features for improved accuracy in determining the temporal aspect at 138 of FIG. 5. These additional processing features will now be described with respect to FIGS. 7-9. These additional processing features can be included in the BCI system 1 and method 100 described above, or they can be included in conventional BCI systems and methods. Also, these additional processing features are described as performed by the VECP processor 8, though in some embodiments this signal processing can be performed by another processor in the BCI system 2.

Figure 7:
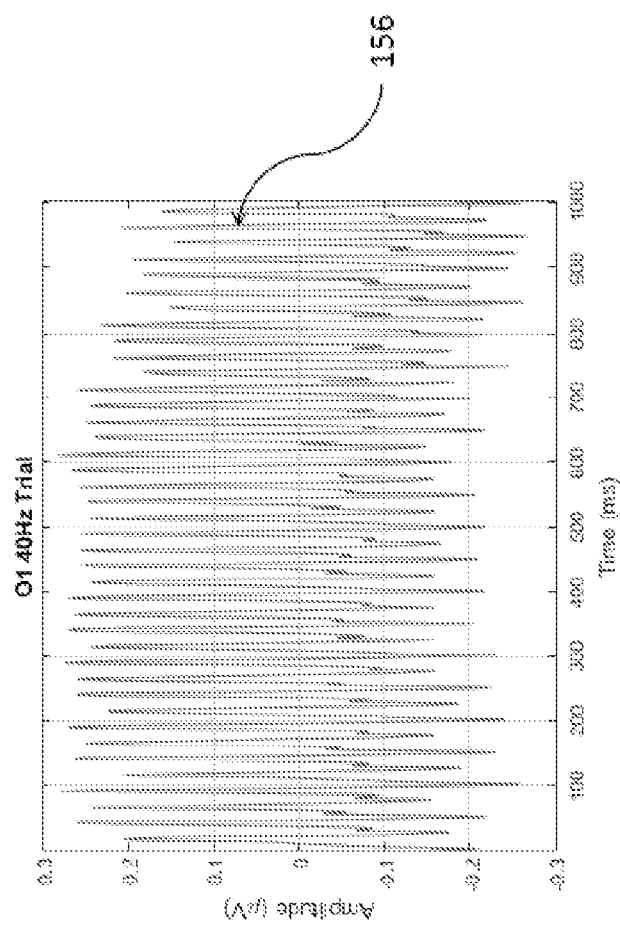
FIG. 7 is a plot of a VECP stimulus signal received from the EEG sensor and processed by the VECP processor according to FIG. 5.

FIG. 7 shows an example VECP signal 156 that is noisy, which makes it difficult for the VECP processor 8 to determine the temporal signal. The example VECP signal 156 includes a 39.8 Hz square wave temporal signal, as is visually evident in FIG. 7. However, as the VECP signal noise and levels can change, the VECP signal must be processed to determine the temporal signal.

Figure 8:
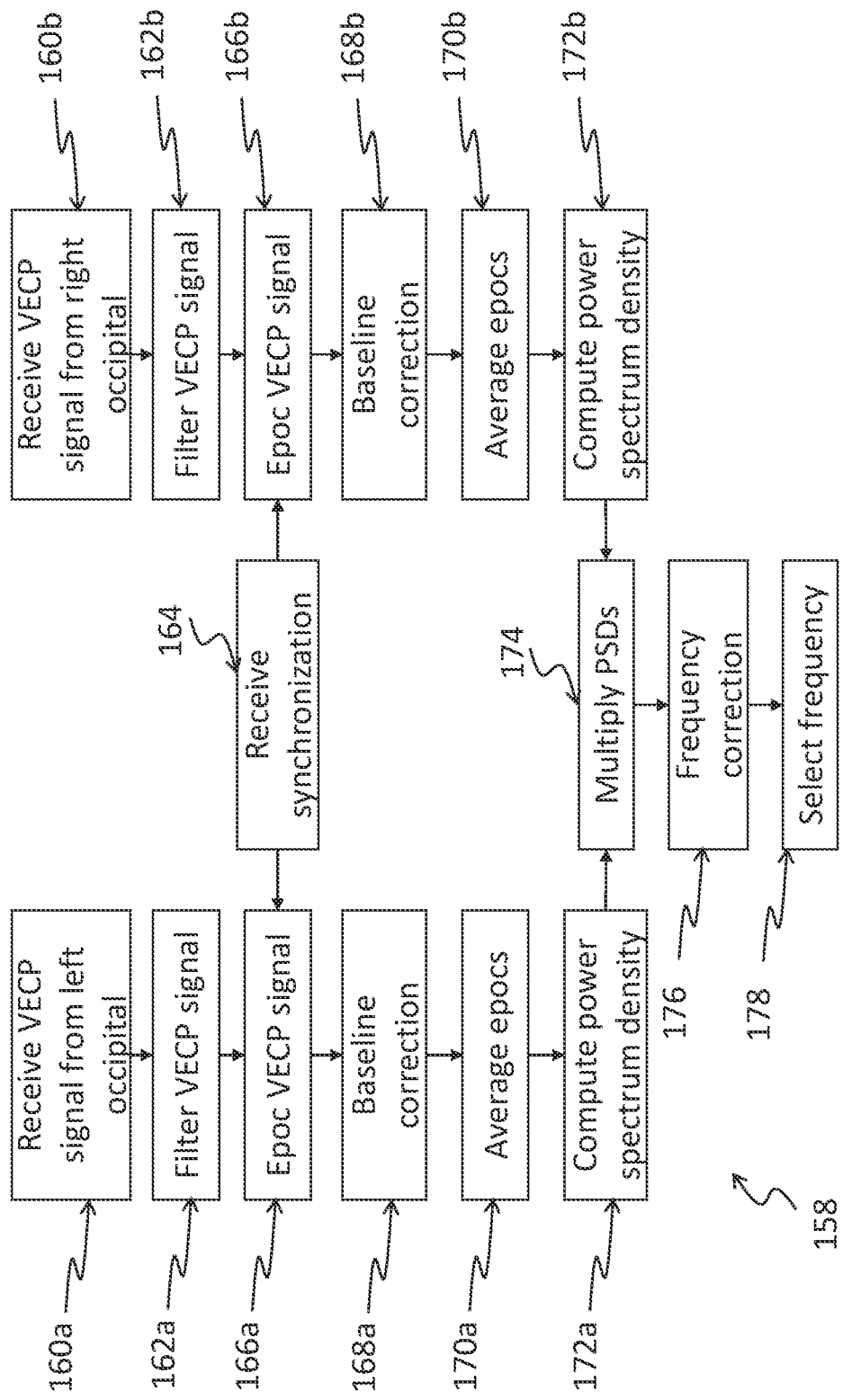
FIG. 8 is a flow diagram showing processing of two different VECP stimulus signals by the VECP processor according to FIG. 5.

FIG. 8 shows an example process 158 for processing the VECP signal of FIG. 7 to determine the temporal signal in a BCI system 1 having left and right occipital EEG sensors 2. In this example, recordings were performed from two EEG electrode sensors 2, each placed on the back of the skull over one of the two occipital lobes. Grounds for each sensor 2 were placed on the participants' mastoid region. BIOPAC 100C amplifiers recorded signals with a gain of 20,000, a low-pass filter of 100 Hz, a high-pass filter of 0.5 Hz, and a sampling rate of 2000 Hz. An RVS having a frequency of about 39.5 Hz was then displayed to the user via the display 10 with a 50 Hz duty cycle.

As shown in the process 158 of FIG. 8, the left and right VECP signals are received by the VECP processor 8 from the left and right occipital lobe EEG sensors 2 at 160a and 160b, respectively. Each of the VECP signals is then filtered by the VECP processor 8, for example in both the forward and backward directions with a finite impulse response bandpass filter designed to pass frequencies between 30 and 50 Hz, at 162a and 162b, respectively.

A synchronization signal is then received by the VECP processor 8 from the temporal controller 20 at 164. The synchronization signal indicates the onset of the RVS, for example every 4th "on" pulse. The synchronization signal is then used by the VECP processor 8 to epoch each of the VECP signals, at 166a and 166b, respectively. For example, the VECP signals can be decomposed into short segments (e.g., 3 s segments), with the epoch being the time period of the segment (e.g., 3 s), with the beginning of each segment corresponding to the onset of a VECP signal pulse as defined by the synchronization signal, and with the epoch selected so that the segments overlap. The mean value is then calculated within each epoch, and this mean is then subtracted from each epoch to provide baseline correction for each VECP signal, at 168a and 168b, respectively. The epochs between eye movements or blinks are then averaged, at 170a and 170b, respectively.

The power spectral density (PSD) function is then computed for the averaged epochs, at 172a and 172b, respectively. The PSD functions for the left and right occipital regions are then multiplied together at 174. It should be noted that other techniques, such as adding or selecting the maximum of each PSD, can be used instead of multiplication in alternative embodiments. The frequency power correction is applied by multiplying each PSD value by its corresponding frequency value, at 176. The frequency having the maximum amplitude is then selected at 178 to identify the frequency of the corresponding RVS.

Figure 9:
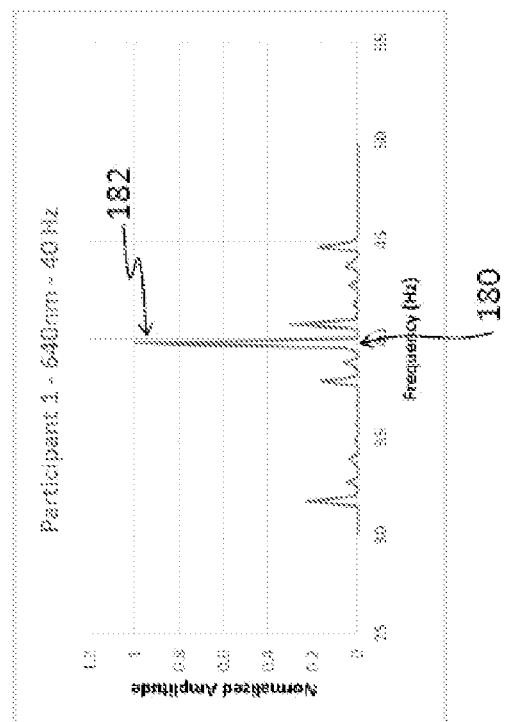
FIG. 9 is a plot of a resultant VECP stimulus signal after processing by the VECP processor according to FIG. 8.

FIG. 9 shows the PSD resulting after 176, with the frequency 180 and the peak value 182 of the signal each indicated. The signal frequency 180 corresponds to the frequency of the RVS. For embodiments in which the temporal aspect was the RVS signal frequency, the signal frequency 180 is then used to identify the corresponding spatial display region 40 having the RVS with the temporal aspect corresponding to the signal frequency 180 within the resulting power spectrum.

Figure 10:
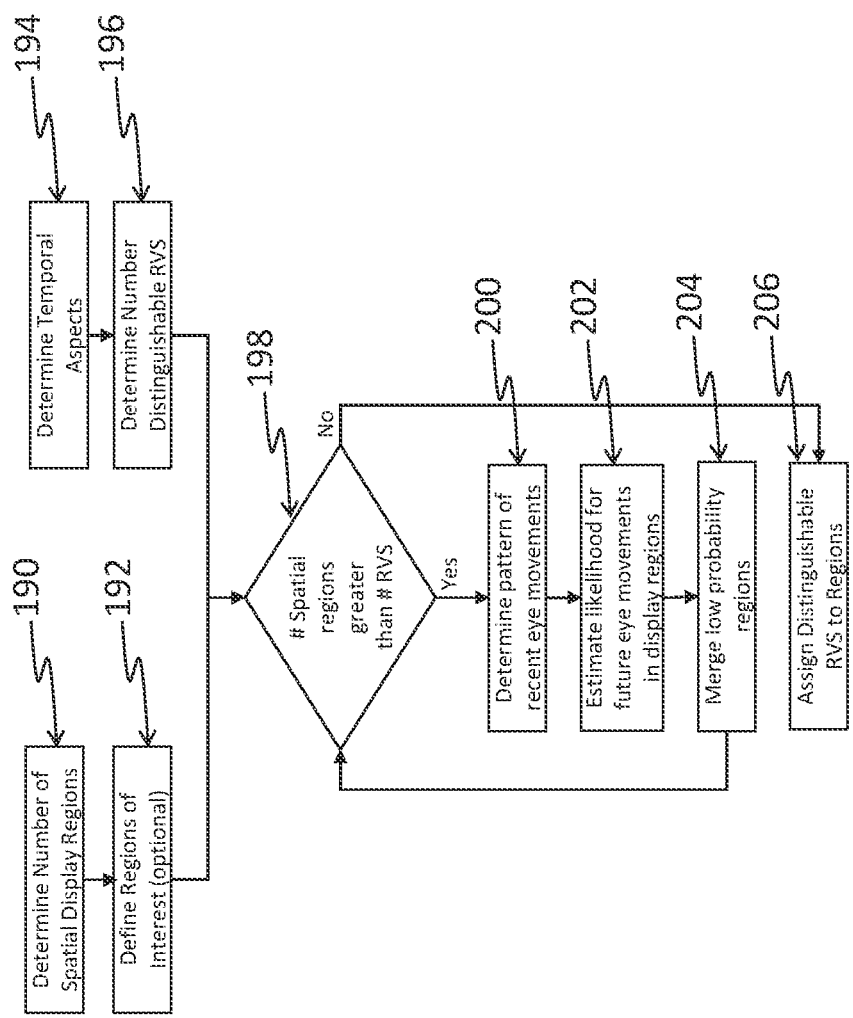
FIG. 10 is a flow diagram showing a temporal mapping process by the system of FIG. 1.

Note that the RVS can be provided to the display 10 within a fixed location or different spatial regions 40 may be driven at different RVS depending upon other information. For example, if a user was fixated at the center of the display 10 and an EOG signal (e.g., from an optical gaze tracker) indicated an eye movement to the right, the system 1 can be configured to assign a single RVS to the entire left side of the display 10 but display numerous RVS on the right side of the display 10. Further, an estimate of eye gaze location might be made from the EOG or gaze tracking information and the density of different RVS might be maximized at the estimated eye location and then decrease as a function of the distance from the estimated eye gaze location In some embodiments, such as an avionics display of an aircraft, the display 10 includes some portions with more "buttons" than other portions, and the system 1 can be configured so that the temporal map provides for more and/or smaller display regions 40 where the higher-density of buttons are. For example, the display regions 40 can all be of the same size and shape (e.g., a regular array), but the temporal map can provide for multiple adjacent regions 40 all displaying RVS having the same temporal aspect to thereby form a larger/combination display region (with a lower density of buttons) than the other/individual display regions 40 (with a higher density of buttons). In such embodiments, a plurality of the temporal controllers 20 can be provided for the display 10, with each temporal controller 20 corresponding to one or more display regions, but with multiple adjacent temporal controllers 20 providing the same temporal aspect to multiple adjacent display regions to form the larger/combination region with a lower density of buttons FIG. 10 shows an example temporal mapping process by the BCI system 1. As shown, to form the temporal map, at 190 the number of spatial display regions supported by the display device is determined. Optionally, the temporal mapping can either be provided or determine regions of particular interest in the information to be displayed to define at 192 the regions of particular interest. In this step, the system 1 may be provided with, for example, the pixels in an image which contain icons or graphics of particular interest. These regions of particular interest may be used to group each of the spatial display regions into particular spatial regions of interest.

In addition, the temporal aspects to be controlled are selected at 194. Based off the temporal aspects to be controlled and the system's ability to distinguish unique RVS, the number of distinguishable RVS are determined. This step may involve known information. For example, assuming the temporal aspects include the frequency and phase of a signal, it may be determined that differences in frequency of 2 Hz and phase differences of 45 degrees is required to provide differentiation and that the frequencies to be applied will be between 45 and 55 Hz. Under these conditions, the system will be able to differentiate 6 frequencies and 8 phase angles or a total of 54 unique RVS. In embodiments including no further support (e.g., no EOG sensor) and no additional mapping features, this is the maximum number of regions that can be differentiated. However, if gaze tracking is provided, then in some embodiments some of these RVS at distant locations on the display can be reused in order to apply other gaze or EOG sensor outputs to differentiate among these elements. In this case, the number of distinguishable RVS might be some multiple of the maximum number determined, depending on how many replicates of the RVS are to be applied.

At 198, a determination is then made as to whether the number of spatial regions of interest exceeds the number of distinguishable RVS which can be produced given the current temporal aspects. If not, then the distinguishable RVS can be applied to the regions of interest. This can be performed in any number of ways, including random selection. However, it is desirable that this allocation be performed to minimize any perception of flicker. For instance, neighboring (adjacent) regions may be selected to differ as much in phase as possible (e.g., 0 and 180 Hz) while maintaining similar frequencies. Such an arrangement ensures that the average display luminance within any neighboring/adjacent regions will be nearly equal. This concept of arranging the RVS to maintain nearly equal average luminance between neighboring/adjacent spatial display regions will aid the minimization of flicker and can support the use of frequencies below 45 Hz if applied appropriately.

If the decision 198 indicates that the number of spatial regions of interest is larger than the number of distinguishable RVS, then a method can be used to further reduce the number of spatial regions to be differentiated. For example, the system may determine at 200 the pattern of recent eye movements as users often repeat scan patterns when performing tasks. This historical data can then be used to estimate at 202 the likelihood of future eye movements across the regions of interest. This probability can then be used to merge at 204 some regions of interest based upon this probability where regions of interest which are near one another (e.g., adjacent) and have a low probability are merged together, reducing the resolution of the map within these areas (e.g., merged/combined adjacent regions) but maintaining high spatial resolution in areas where eye movements are likely to occur. Through this merging process, the total number of spatial regions are reduced until enough RVS are available to address each of the spatial regions of interest such that the regions can be assigned an RVS to form the temporal map which associates the resulting spatial regions of interest on the display with a unique RVS. This map includes coordinates (for example, pixels) which define the area of each spatial region of interest and the associated temporal aspects of the RVS assigned to each spatial region.

It is to be understood that this invention is not limited to the specific devices, methods, conditions, and/or parameters described and/or shown herein, and that the terminology used herein is for the purpose of describing particular embodiments by way of example only. Thus, the terminology is intended to be broadly construed and is not intended to be unnecessarily limiting of the claimed invention. For example, as used in the specification including the appended claims, singular forms (e.g., "a," "an," and/or "one") include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A brain-computer interface system, comprising:
   a video processor configured to produce a display control signal;
   a temporal controller configured to produce a plurality of repetitive visual stimulus (RVS) signals, each with a different respective temporal aspect, wherein the RVS signals with the different respective temporal aspects are separate and independent from and not embedded in the display control signal;
   a display device for displaying an image and having a plurality of display regions, each of the plurality of display regions including a plurality of light emitting elements, the display device being configured to create an image in response to receiving both the display control signal and the RVS signals, the display control signal controls each of the plurality of light emitting elements and the RVS signals control each of the display regions;
   an electroencephalographic (EEG) sensor configured to sense a visually-evoked cortical potential (VECP) signal in a user whose eyes are fixed on a viewed one of the display regions; and
   a VECP processor configured to process the VECP signal to identify the viewed one of the display regions.

2. The brain-computer interface system of claim 1, wherein the temporal aspects of the RVS signals include the shape of the frequencies, waveform amplitudes, duty cycle, or phases of the RVS signals, other temporal characteristics of the RVS signals, or a combination thereof.

3. The brain-computer interface system of claim 1, wherein the temporal aspects of the RVS signals are the sufficiently high frequencies that do not produce visually perceptible flicker of the displayed RVS.

4. The brain-computer interface system of claim 3, wherein the sufficiently high frequencies of the RVS signals are not an even divisor of an update rate of the display device.

5. The brain-computer interface system of claim 3, wherein the sufficiently high frequencies of the RVS signals are greater than one-half an update rate of the display device.

6. The brain-computer interface system of claim 1, wherein the sufficiently high frequencies of the RVS signals are between about 30 and about 120 Hz.

7. The brain-computer interface system of claim 1, wherein the temporal controller is configured to send a synchronization signal to the VECP processor, wherein the synchronization signal indicates a pulse onset of the RVS signals with the different respective temporal aspects, and in response the VECP processor determines the onset of the RVS for each of the display regions of the display device.

8. The brain-computer interface system of claim 1, wherein the display device includes a display module and a backlight, wherein the display module is configured to receive the display control signal from the video processor to produce the displayed image and the backlight is configured to receive the RVS signals with the different respective temporal aspects from the temporal controller to produce the RVS with the different respective temporal aspects in the respective display regions.

9. The brain-computer interface system of claim 1, further comprising an electrooculogram (EOG) sensor configured to sense eye movement and/or fixation in the user and sending a corresponding EOG signal to the VECP processor, wherein the VECP processor is configured to process the EOG signal to identify the viewed one of the display regions indicated by the EOG and performs a reconciliation process to confirm that the viewed display region indicated by the EOG signal matches the viewed display region indicated by the EEG signal.

10. The brain-computer interface system of claim 1, wherein the temporal controller is provided by a plurality of temporal controllers in a distributed arrangement that each produce one or more of the repetitive visual stimulus (RVS) signals with the different respective temporal aspects.

11. The brain-computer interface system of claim 1, wherein the display device includes an array of light-emitting elements that displays the image in the display regions based on the display control signal and another array of light-emitting elements that displays the RVS in the display regions based on the separate and independent RVS signals.

12. A brain-computer interface system, comprising:
a video processor configured to produce a display control signal;
a temporal controller configured to producing a plurality of repetitive visual stimulus (RVS) signals each with a different respective temporal aspect, wherein the temporal controller is separate and independent from the video processor, wherein the RVS signals with the different respective temporal aspects are not embedded in the display control signal and are separate and independent from the display control signal, and wherein the temporal aspects of the RVS signals include frequencies, amplitudes, or phases of the RVS signals, other temporal characteristics of the RVS signals, or a combination thereof;
a display device for displaying an image and having a display module and a backlight, wherein the display module includes a plurality of display regions, each of the plurality of display regions including a plurality of light emitting elements, the display module being configured to receive both the display control signal and the RVS signals, the display control signal controls each of the plurality of light emitting elements and the RVS signals are mapped to and control each of the plurality of the display regions so that the RVS displayed by each respective one of the display regions have a different respective one of the temporal aspects than the RVS displayed by each other of the display regions, and wherein the frequencies of the RVS signals are at least 30 Hz;
an electroencephalographic (EEG) sensor configured to sense a visually-evoked cortical potential (VECP) signal in a user whose eyes are fixed on a viewed one of the display regions; and
a VECP processor configured to process the VECP signal to identify the viewed one of the display regions, wherein the temporal controller is configured to send a synchronization signal to the VECP processor, wherein the synchronization signal indicates a pulse onset of the RVS signals with the different respective temporal aspects, and in response the VECP processor determines the onset of the RVS for each of the display regions of the display device.

13. The brain-computer interface system of claim 12, wherein the temporal aspects of the RVS signals are the sufficiently high frequencies that do not produce visually perceptible flicker of the displayed RVS.

14. The brain-computer interface system of claim 13, wherein the sufficiently high frequencies of the RVS signals are not an even divisor of an update rate of the display device.

15. The brain-computer interface system of claim 13, wherein the sufficiently high frequencies of the RVS signals are at least one-half an update rate of the display device.

16. The brain-computer interface system of claim 12, further comprising an electrooculogram (EOG) sensor configured to sense eye movement and/or fixation in the user and sending a corresponding EOG signal to the VECP processor, wherein the VECP processor processes the EOG signal to identify the viewed one of the display regions indicated by the EOG and performs a reconciliation process to confirm that the viewed display region indicated by the EOG signal matches the viewed display region indicated by the EEG signal.

17. The brain-computer interface system of claim 12, wherein the temporal controller is provided by a plurality of temporal controllers in a distributed arrangement that each produce one or more of the repetitive visual stimulus (RVS) signals with the different respective temporal aspects.

18. A computer-interfacing method of using a display system comprising a display device, a video processor, and a temporal controller in a brain-computer interface system that also includes a VECP controller and an EEG sensor, the method comprising:
sending, via the temporal controller, a plurality of repetitive visual stimulus (RVS) signals, to the display, each RVS signal having a different respective temporal aspect and a mapping including a division of the display device into a plurality of display regions, wherein the RVS signals control each of the plurality of display regions, the temporal aspects of the RVS signals are not embedded in the display control signal and are separate and independent from the display control signal;
receiving at the display device, both a control signal from the video processor and the RVS signals and the mapping from the temporal controller and in response displaying corresponding RVS in corresponding display regions of the display device with the RVS displayed by each one of the display regions having a different respective one of the temporal aspects from the RVS displayed by each other of the display regions; and
displaying a corresponding image in response to receiving both the display control signal and the RVS signals on the display regions of the display device,
wherein the RVS signals with the different respective temporal aspects each produce a respective visually-evoked cortical potential in a user viewing the display device, and wherein the visually-evoked cortical potentials are detectable by the EEG sensor for processing by the VECP controller to identify a viewed one of the display regions where the user's eyes are fixed.

19. The computer-interfacing method of claim 18, further comprising:
sending, via the temporal controller, a synchronization signal to the VECP controller, wherein the synchronization signal indicates a pulse onset of the RVS signals with the different respective temporal aspects so that the VECP controller can determine the onset of the RVS for each of the display regions of the display device.

20. The computer-interfacing method of claim 18, wherein the temporal aspects of the RVS signals include the frequencies, amplitudes, or phases of the RVS signals, other temporal characteristics of the RVS signals, or a combination thereof.

* * * * *

UNITED STATES PATENT AND TRADEMARK OFFICE
CERTIFICATE OF CORRECTION

PATENT NO. : 12,197,648 B2
APPLICATION NO. : 18/104913
DATED : January 14, 2025
INVENTOR(S) : Michael E. Miller et al.

Page 1 of 1

It is certified that error appears in the above-identified patent and that said Letters Patent is hereby corrected as shown below:

On the Title Page

Item (73) Assignee:
Replace Assignee from "United States of America as Represented by the Administrator of NASA" with -- United States of America as Represented by the Administrator of NASA Washington, DC (US) and Government of the US as Represented by the Secretary of the Air Force, Wright Patterson AFB, Ohio (US) --

Signed and Sealed this
Twenty-fifth Day of March, 2025

Coke Morgan Stewart
*Acting Director of the United States Patent and Trademark Office*